(12) United States Patent
Zhang et al.

(10) Patent No.: US 12,174,055 B2
(45) Date of Patent: Dec. 24, 2024

(54) IN OR RELATING TO FIELD DEVICES

(71) Applicant: Rosemount Tank Radar AB, Mölnlycke (SE)

(72) Inventors: Jingdong Zhang, Slough (GB); Timothy Hill, Compton (GB); Marianne Williams, Bracknell (GB)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 16 days.

(21) Appl. No.: 17/775,648

(22) PCT Filed: Nov. 11, 2020

(86) PCT No.: PCT/EP2020/081709
§ 371 (c)(1),
(2) Date: May 10, 2022

(87) PCT Pub. No.: WO2021/094351
PCT Pub. Date: May 20, 2021

(65) Prior Publication Data
US 2022/0397444 A1     Dec. 15, 2022

(30) Foreign Application Priority Data

Nov. 14, 2019 (GB) .................................. 1916592

(51) Int. Cl.
*G01F 25/20* (2022.01)
*G01F 23/284* (2006.01)
*G01F 23/296* (2022.01)

(52) U.S. Cl.
CPC ............ *G01F 25/20* (2022.01); *G01F 23/284* (2013.01); *G01F 23/2961* (2013.01)

(58) Field of Classification Search
USPC ........................................................... 73/1.73
See application file for complete search history.

(56) References Cited

U.S. PATENT DOCUMENTS 6,389,891 B1 * 5/2002 D'Angelico ............ G01F 25/20
73/304 R
8,869,597 B2   10/2014 Brengartner et al.
(Continued)

FOREIGN PATENT DOCUMENTS

DE   10 2006 016 381    10/2007
DE   10 2011 075 113    11/2012
(Continued)

OTHER PUBLICATIONS

International Search Report and Written Opinion for International Application No. PCT/EP2020/081709, dated Jan. 22, 2021.
(Continued)

*Primary Examiner* — Daniel S Larkin
(74) *Attorney, Agent, or Firm* — Westman, Champlin & Koehler, P.A.

(57) ABSTRACT

The invention provides a method of verifying the health of a liquid level detection device, preferably a vibrating fork level switch, while the device remains in situ. The method includes, independently of the device, verifying if the fork tines are fully wet or fully dry. This step can be carried out by a further, independent, level measuring apparatus.

15 Claims, 3 Drawing Sheets

(56) References Cited

U.S. PATENT DOCUMENTS

| | | | |
|---|---|---|---|
| 9,377,343 B2 * | 6/2016 | Urban | G01F 25/20 |
| 10,088,351 B2 | 10/2018 | Gerding et al. | |
| 2005/0035769 A1 | 2/2005 | Otto et al. | |
| 2011/0145180 A1 * | 6/2011 | Muller | G05B 19/042 |
| | | | 706/23 |
| 2012/0279283 A1 | 11/2012 | Brengartner et al. | |
| 2013/0118254 A1 * | 5/2013 | Urban | G01F 23/2968 |
| | | | 73/304 C |
| 2013/0269414 A1 * | 10/2013 | Ferraro | G01F 23/2967 |
| | | | 73/1.73 |
| 2013/0317766 A1 | 11/2013 | Decker | |
| 2014/0028492 A1 * | 1/2014 | Mayer | G01F 23/284 |
| | | | 342/124 |
| 2017/0074708 A1 | 3/2017 | Gerding et al. | |

FOREIGN PATENT DOCUMENTS

| | | | | |
|---|---|---|---|---|
| DE | 20 2015 101 193 | | 6/2016 | |
| DE | 10 2015 115 614 | | 3/2017 | |
| WO | WO 02097380 | * | 12/2002 | G01F 23/266 |
| WO | WO 2008/091548 | | 7/2008 | |
| WO | WO 2010/055415 | | 5/2010 | |

OTHER PUBLICATIONS

Notice of Opposition from European Application No. 20806962.5, dated Feb. 26, 2024, Machine Translation.

* cited by examiner

IN OR RELATING TO FIELD DEVICES

CROSS-REFERENCE TO RELATED APPLICATION

This Application is a Section 371 National Stage Application of International Application No. PCT/EP2020/081709, filed Nov. 11, 2020, which claims priority to the Great Britain Patent Application No. 1916592.7 filed on Nov. 14, 2019, and published as WO 2021/094351 on May 20, 2021, in English, the entire contents of which are hereby incorporated by reference in their entireties.

FIELD OF THE INVENTION

This invention relates to level switches used in process control and, in particular, to a method of and/or system for verifying the status of such a switch while in situ in an operating environment. Whilst the following description is directed to a vibrating fork level switch, those skilled in the art will appreciate that the method disclosed herein could also be applied to other level switch technologies including, but not necessarily limited to, capacitance and vibrating rod.

BACKGROUND

A vibrating fork level switch is a well-known form of device widely used in process control applications. Typically, the device is driven at its resonance frequency, which frequency changes depending on the medium in contact with the fork tines. In one typical application, the fork is mounted in the wall of a tank, into which liquid is pumped, the tines projecting into the interior of the tank. The tines vibrate at a 'dry' frequency for so long as the tines remain uncovered, but vibrate at a lower, 'wet', frequency when the liquid level in the tank rises to cover the tines. These changes in fork frequency are monitored and the instrument prompts a switching operation when the frequency changes from dry to wet, to, for example, either start or stop a pump, or trigger a "high" level alert or alarm.

In another application, an instrument may be mounted at a low level near or on the base of the tank and in a position where the tines will normally be covered by a process liquid. In this application, when the liquid level falls below the level of the tines, the frequency will rise from the wet frequency to the dry frequency. This change may, for example, start or stop a pump, or trigger a "low" level alert or alarm.

Typically, the operation of the switch will vary over time and it is therefore important to verify the health of the switch and ensure that the switch is operating within an acceptable parameter range. For example, over time the tines may become coated with residues from process liquid coming into contact with the switch, or the tines may experience corrosion; both of which will alter the wet and dry frequencies.

Historically, switches of this type would be checked by a field engineer who would attend the location of the switch, manually dismount it and physically inspect it. This procedure is heavily time and cost consuming from a labour viewpoint and typically requires interruption/shut-down of the process. Further, the engineer may be subjected to risks if exposed to toxic process liquids/vapors, or from working at height in the case of a switch mounted on the top of a tall tank.

In our International Patent Application No. WO 2010/055415 we describe a method of detecting coating on the fork tines without the need to physically access the instrument, but the described method assumes that, if the observed sensor frequency is within a certain band, the sensor is either wet or dry as the case may be. A problem with this assumption is that dried process material may be bridging the space between the fork tines leading to a frequency indicative of wet when the tines are, in fact, in dry space above the liquid surface.

It is an object of the present invention to provide a method and/or system for verifying the health of a level sending device which goes at least some way to addressing the problems identified above; or which at least offers a novel and useful choice.

SUMMARY OF THE INVENTION

Accordingly, in a first aspect, the invention provides a method of monitoring a condition of a device configured to determine a level of liquid in a container, comprising the steps of: providing at least one reference value of an operating parameter, indicative of whether the device is fully above the liquid ('dry') or fully immersed in the liquid ('wet'); acquiring, by said device, a present value of the operating parameter; determining, independently of said device, whether said device is wet or dry while acquiring said present value of the operating parameter; comparing said present value of the operating parameter with the at least one reference value of the operating parameter; and providing, based on the comparison and on the determination whether or not the device is wet or dry, an output indicative of the condition of the device.

Preferably, said method comprises comparing the observed operating parameter with a stored operating parameter which is within a given range.

Preferably, said device is a vibrating fork level switch configured to operate in resonance; the at least one predetermined stored operating parameter comprising resonant frequency ranges for the vibrating fork level switch when dry and wet respectively; and wherein the observed operating parameter is resonant frequency.

The step of verifying whether the device is wet or dry may be established manually and manually inputted to said device through a local operator interface or by way of a command via a communication protocol.

Alternatively, the step of verifying whether the device is wet or dry is effected using a further independent level detection apparatus, said device and said further level detection apparatus communicating automatically via a common communication protocol.

Preferably, said method comprises using a further independent continuous level measurement apparatus.

Preferably, a plurality of level sensing devices is included within a loop together with said further level detection apparatus, said further level detection apparatus communicating with all of said devices via a common communication protocol.

Preferably, communication is effected by way of HART or Fieldbus protocol.

Preferably, the stored operating parameter indicative of dry is set by way of a dry calibration procedure.

Preferably, said dry calibration procedure includes accommodating frequency changes due to temperature and/or pressure.

Preferably, the stored parameter indicative of wet is set upon installation of the device on said container; or by exposure to a sample of the process liquid prior to installation.

Preferably, the step of providing an output indicative of the condition of the device comprises communicating an output of 'healthy', 'caution' or 'alarm'.

Preferably, said observed operating parameter and subsequent changes in said observed parameter are stored within said device, said method comprising determining, from said changes, one or more trends indicative of physical changes to said device.

In a second aspect, the invention provides a level sensing device for determining a level of a liquid in a container, the level sensing device comprising: memory for storing at least one reference value of an operating parameter, indicative of whether the device is fully above the liquid ('dry') or fully immersed in the liquid ('wet'); an actuator configured to exhibit different values of the operating parameter depending on whether the actuator is wet or dry; and a processor coupled to the actuator and configured to: acquire, from the actuator, a present value of the operating parameter; receive a result of a determination, performed independently of said device, whether said device was wet or dry when the present value of the operating parameter was acquired; compare the present value of the operating parameter with the at least one reference value of the operating parameter stored in the memory; and provide, based on the comparison and on the result of the determination whether or not the device is wet or dry, an output indicative of the condition of the device.

Preferably, the level sensing device comprises a vibrating fork level switch.

In a third aspect, the invention provides a monitoring system for monitoring a status of a container, comprising: a level sensing device for determining a level of a liquid in the container, the level sensing device comprising an actuator configured to exhibit different values of an operating parameter depending on whether the actuator is wet or dry; and a processor coupled to the actuator and configured to acquire, from the actuator, a present value of the operating parameter; and a host system in communication with the level sensing device, the host system comprising processing circuitry configured to: receive, from the level sensing device, the present value of the operating parameter; compare the present value of the operating parameter with a reference value of the operating parameter indicative of whether the level sensing device is fully above the liquid ('dry') or fully immersed in the liquid ('wet'); and provide, based on the comparison and on a determination, performed independently of the level sensing device, whether the level sensing device was wet or dry when the present value of the operating parameter was acquired by the processor of the level sensing device, an output indicative of the condition of the device.

Many variations in the way the invention may be performed will present themselves to those skilled in the art upon reading the following description. The description which follows should not be regarded as limiting but rather, as one illustration only of one manner of performing the invention. Within the scope of the appended claims, wherever possible any element or component should be taken as including any or all equivalents thereof whether or not specifically mentioned.

BRIEF DESCRIPTION OF THE DRAWINGS

An embodiment of the invention will now be described with reference to the accompanying drawings in which.

DESCRIPTION OF WORKING EMBODIMENTS

The invention provides a method and system for verifying the health of a device used to indicate the level of a liquid medium in a container, such as a process tank. Whilst the invention could be applied to such devices operating according to a variety of different technologies, the example in this particular description relates to a vibrating fork level switch.

Figure 1:
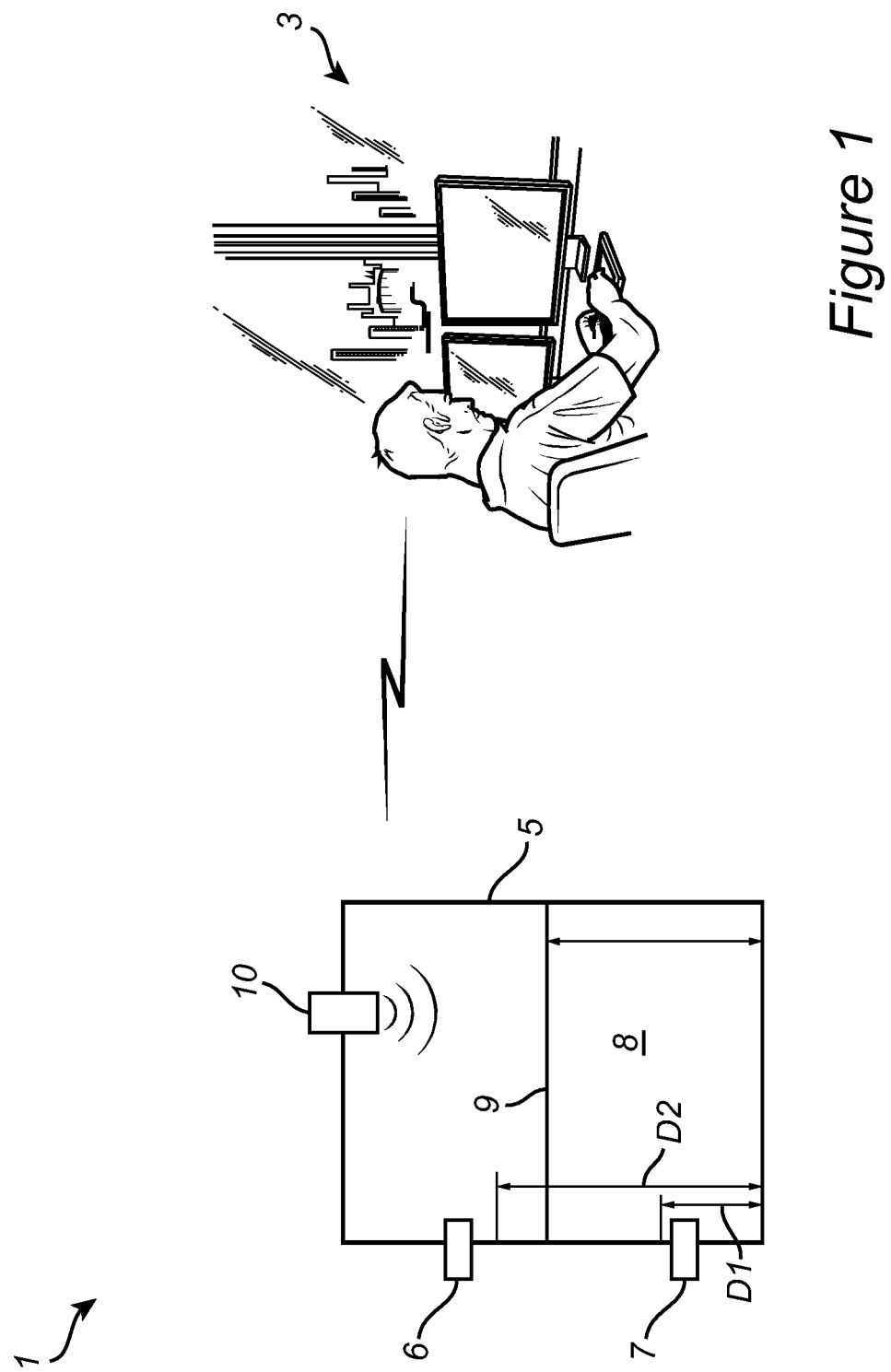
FIG. 1: shows a schematic view of a monitoring system according to an embodiment of the invention.

FIG. 1 schematically shows a monitoring system 1 for monitoring a status of a container 5, comprising first 6 and second 7 vibrating level fork switches, and a host system 3 illustrated as a control room.

As shown in FIG. 1, vibrating fork level switches 6 and 7 are mounted in the wall of a process tank or container 5. Tank 5 contains a process liquid 8, the upper surface of which is shown at 9. By way of example only, the switches 6 and 7 may, for example, comprise those sold under the trademark Rosemount 2140.

The switch 6 is a "high" level switch. That is to say it is normally uncovered, or 'dry', and performs a switching function or outputs an alarm when the liquid surface 9 rises into contact with the switch. The switching function may, for example, be used to switch off a pump directing liquid 8 into the tank. On the other hand, the switch 7 is a "low" level switch and is normally covered by the liquid, or 'wet'. The switch 7 performs a switching function or outputs an alarm when the surface 9 falls below the level of the switch. This latter switching function may start the pump to direct more liquid into the tank.

Figure 2:
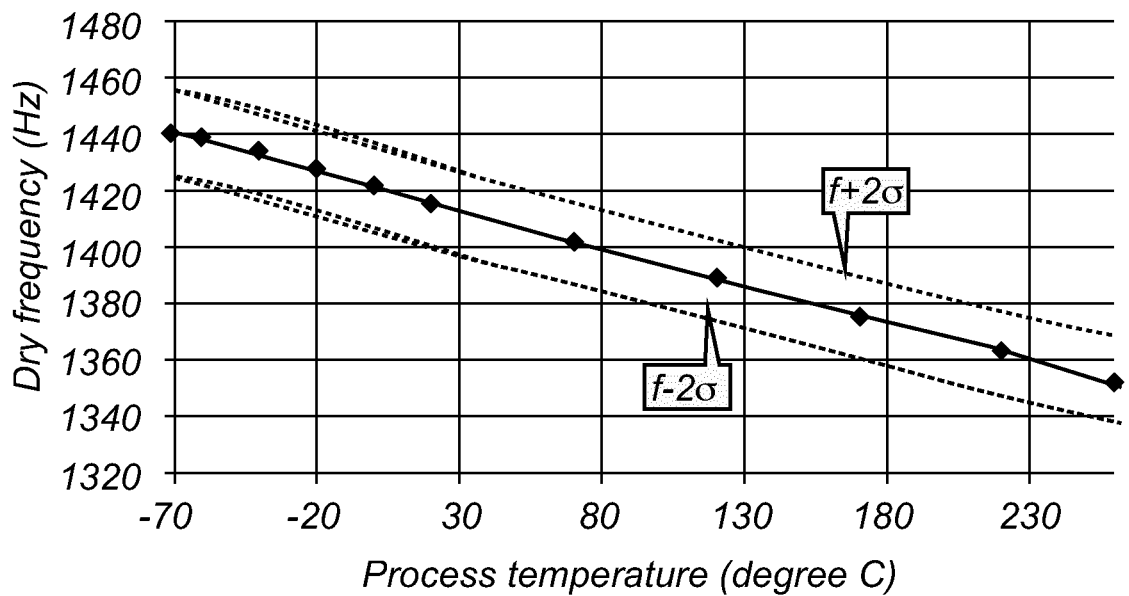
FIG. 2: shows an illustration of a dry fork frequency band in which the frequency varies with process temperature.
Figure 3:
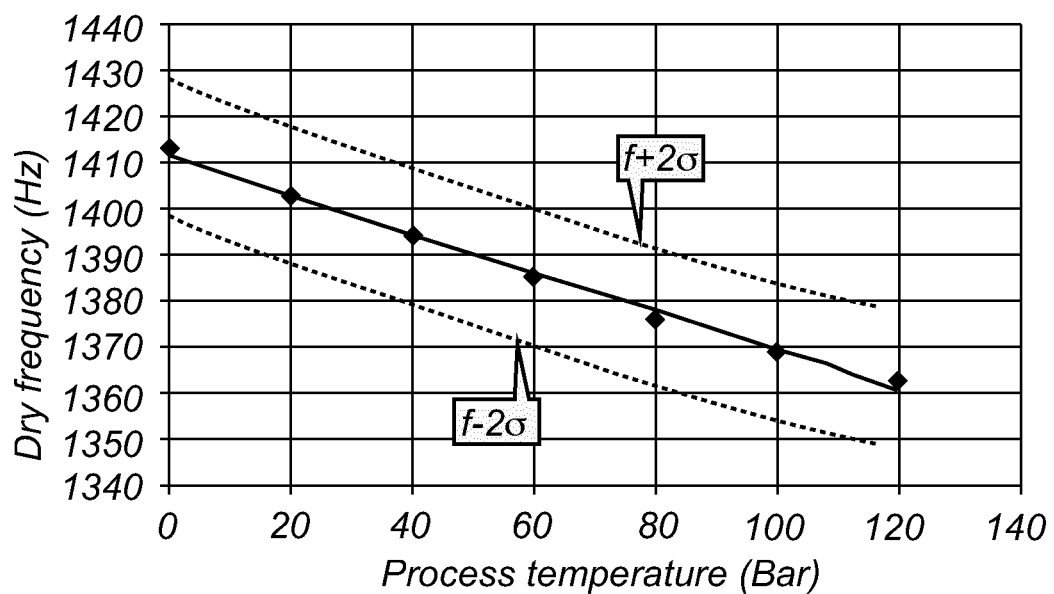
FIG. 3: shows an illustration of a dry fork frequency band in which the frequency varies with process pressure.
Figure 4:
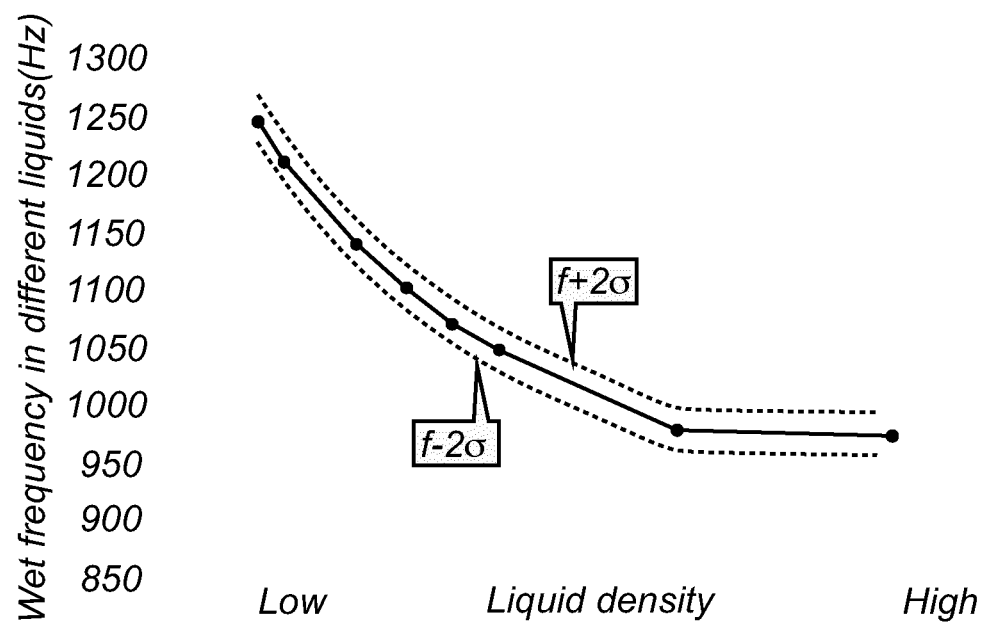
FIG. 4: shows an illustration of a wet fork frequency in different liquids in which the frequency varies with the density of the process liquid

The variation in, and the trend of, resonant frequency of a vibrating fork level switch, when fully dry or fully wet, may be used to monitor the health status of the fork. In particular, changes in the fork's behavior arising from corrosion or coating of the tines, will be reflected in changes in the dry and wet fork resonant frequencies. When operating normally and correctly, the resonant frequency of a vibrating fork level switch, when fully dry or fully wet, will fluctuate slightly but remains in narrow frequency bands as shown in FIGS. 2, 3, and 4. The terms 'fully dry' and 'fully wet' mean the fork tines are fully clear of or fully immersed, respectively, in the process liquid.

The width of frequency bands in FIGS. 2, 3 & 4 are set empirically and lie between $[f_{dry}-2\sigma\ f_{dry}+2\sigma]$ or $[f_{wet}-2\sigma\ f_{wet}+2\sigma]$, the bands in these Figures including known sensitivities to changes in process conditions, such as temperature, pressure and liquid density.

The frequency of a vibrating fork level switch in a fully dry state is a reliable indicator of the health status of the fork having regard to factors, such as corrosion or coating of the fork tines. With an acceptable threshold range of fork resonant frequencies in a fully dry state pre-set, the resonant frequency of device when in situ and in a known fully dry state can be compared, allowing the health status of the vibrating fork level switch to be determined. If this check is carried out periodically and the obtained resonant frequency is stored in the memory of device, a simple trend analysis of historical data of resonant frequency can be obtained, which may provide a clear indication of the service life for the device.

In the fully wet state, the resonant frequency of fork will depend on the nature of the process liquid, so a threshold range of normal wet frequency must be set during the initial installation of the device, or in a factory calibration using a sample of the process liquid with which the device is to be used. With an acceptable threshold range of fork resonant frequencies in a fully wet state then pre-set, the resonant frequency of device, when in situ and in a known fully wet state, the health status of the vibrating fork level switch can be determined. If this check is carried out periodically and the obtained resonant frequency is stored in the memory of device, a simple trend analysis of historical data of resonant frequency can be obtained which will provide a clear indication of the service life for the device.

Whether the comparison is made when the switch is fully dry or fully wet, it is imperative that the wet/dry status is confirmed, as an indication from the switch itself cannot be trusted absolutely. This is because factors arising in service may lead to false indications. For example, the switch may have been damaged during installation causing it to resonate at frequencies outside the pre-set bands. Further, material from the process liquid may bridge the space between the fork tines giving rise to a false indication of wet when, in fact, the tines are above the liquid level. Embodiments of the present invention address these problems by providing a means of verifying, independently of the switch, whether the fork tines are wet or dry; and this while the switch remains in situ on the tank.

Referring back to FIG. 1, as described above, switch 6 is used as high level alarm and switch 7 is used as low level alarm. In addition, a further, independent level measuring apparatus 10, such as a continuous ultrasonic/radar level transmitter, may be employed and configured to define fully wet and fully dry conditions as follows:

Full dry condition: liquid level 9<D2 for level switch 6
Full wet condition: liquid level 9>D1 for level switch 7

D1 & D2 are set empirically but having regard to possible measurement errors arising from the level transmitter 10. By way of example only, D1 may be 20 cm higher than the installation position of vibrating fork level switch 7, while D2 may be 20 cm lower than the installation position of vibrating fork level switch 6.

With apparatus 10 in position on the tank 5, two proposed ways will now be described for undertaking the verification process according to the invention.

In an essentially manual process, a site service engineer obtains the wet or dry status of switches 6 and/or 7 using apparatus 10, or by visual inspection. He can then provide an indication of the status of the switches (or one of the switches) to the host system 3, and/or invoke the health check functions of switches 6 & 7 through a local operator interface (LOI) included in the switch, or via a communication protocol, such as, for example, HART or Fieldbus. In the case where the indication of the status is provided to the host system 3 of the monitoring system 1, the host system 3 may acquire the reference value(s) and the present value(s) of the operating parameter from the level switch(es) 6 and/or 7, compare the reference value(s) and the present value(s), and provide, based on the result of the comparison and the indication provided by the site service engineer, an output indicative of the condition of the level switch(es). This output may, for example, be provided on a screen in a control room, such as that indicated in FIG. 1. In the case where the indication of the status is provided to the level switch(es), the processor within the level switch is configured to then compare the current observed resonant frequency of the switch with the appropriate wet or dry pre-set threshold range, and provide an output indicative of health. For example, the output may be a signal indicating 'healthy', 'caution', or 'alarm' according to whether current frequency is inside, on the limit of, or outside the pre-set threshold range. The observed resonant frequency is then stored, with a time stamp, in the memory of the switch. Successive stored frequencies can be processed to provide an indication of trend in the condition of the switch.

In a more automated embodiment, the invention actively combines the level switches 6 & 7 with the further e.g. continuous radar/ultrasonic level transmitter 10 to provide a full level control and monitoring system 1 for an industrial process tank in which the level switches 6 & 7 provide high and low alarm level indicators and the transmitter 10 provides an indication of current level. Both the level transmitter 10 and the level switches 6 & 7 may be configured with a communication protocol, such as HART or Fieldbus, etc. Taking a HART communication protocol, as an example, during the installation, the devices 6, 7 & 10 may be arranged in a communications loop with the level transmitter 10 configured as a secondary master device to broadcast the measured tank level at regular time intervals, say daily, weekly or monthly, to all of HART configured devices in the loop, the resulting tank level information, preferably, being encrypted for security. As receivers, the vibrating fork level switches 6 & 7 will monitor the broadcasted tank level and thus be able to verify if they are in fully dry or fully wet states. Having established the fork status the comparison described above can be made, the output provided, and the frequencies observed at the regular time intervals stored and processed to provide trend information.

According to another example configuration of the monitoring system 1, the host system 3 may acquire signals from the level transmitter 10 as well as from the level switches 6 and 7, and automatically determine the status of the level switches 6 and 7 based on the acquired signals. In particular, the host system 3 may acquire, from the level transmitter 10, a signal indicative of a present level of liquid in the tank 5, and determine, based on the acquired signal from the level detection apparatus and a known level of the level switch, whether the level switch was wet or dry when the present value of the operating parameter was acquired by the processor of the level switch. Based on this determination, and a comparison between the reference value(s) of the operating parameter and the present value(s) of the operating parameter, the host system 3 may estimate the present condition of the level switch(es) 6 and 7. The at least one reference value of the operating parameter for a level switch 6 and 7 may be kept in a database in the host system 3, linking the identity of a particular level switch with its at least one reference value of the operating parameter. Alternatively, each level switch may keep its at least one reference value of the operating parameter in its own memory, which may facilitate installation of new level sensing devices in a monitoring system 1.

The invention claimed is:

1. A method of monitoring a condition of a device configured to determine a level of liquid in a container, comprising the steps of:
    providing at least one reference value of an operating parameter, indicative of whether the device is fully above the liquid ('dry') or fully immersed in the liquid ('wet');
    acquiring, by said device, a present value of the operating parameter;

determining, independently of said device, whether said device is wet or dry while acquiring said present value of the operating parameter;

comparing said present value of the operating parameter acquired by said device with the at least one reference value of the operating parameter; and providing, based on the comparison and on the determination whether or not the device is wet or dry, an output indicative of the condition of the device.

2. The method as claimed in claim 1, wherein the at least one reference value of the operating parameter is stored within the device.

3. The method as claimed in claim 1, wherein:

said device is a vibrating fork level switch configured to operate in resonance;

the at least one reference value of the operating parameter comprises resonant frequency ranges for the vibrating fork level switch when dry and wet respectively; and the present value of the operating parameter is a present value of the resonant frequency.

4. The method as claimed in claim 1, wherein the step of determining whether the device is wet or dry is carried out through manual observation.

5. The method as claimed in claim 1, wherein the step of determining whether the device is wet or dry is carried out using an independent level detection apparatus.

6. The method as claimed in claim 1, wherein the step of providing an output indicative of the condition of the device comprises communicating an output indicative of one condition selected from 'healthy', 'caution' or 'alarm'.

7. The method as claimed in claim 1, further comprising the steps of:

storing the present value of the operating parameter acquired at different times, resulting in a stored time-series of values; and determining, based on the stored time-series of values, one or more trends indicative of a physical change to said device.

8. A level sensing device for determining a level of a liquid in a container, the level sensing device comprising:

memory for storing at least one reference value of an operating parameter, indicative of whether the device is fully above the liquid ('dry') or fully immersed in the liquid ('wet');

an actuator configured to exhibit different values of the operating parameter depending on whether the actuator is wet or dry; and a processor coupled to the actuator and configured to:

acquire, from the actuator, a present value of the operating parameter;

receive a result of a determination, performed independently of said device, whether said device was wet or dry when the present value of the operating parameter was acquired;

compare the present value of the operating parameter acquired by the processor coupled to the actuator with the at least one reference value of the operating parameter stored in the memory; and provide, based on the comparison and on the result of the determination whether or not the device is wet or dry, an output indicative of the condition of the device.

9. The level sensing device as claimed in claim 8, wherein the actuator is a vibrating fork.

10. A level sensing system comprising:

the level sensing device as claimed in claim 8; and a level detection apparatus arranged and configured to determine the level of liquid in the tank.

11. The level sensing system as claimed in claim 10, wherein the level detection apparatus is an ultrasonic transmitter or a radar level transmitter.

12. The level sensing system as claimed in claim 10, wherein the level sensing device and the level detection apparatus are configured to communicate through a common communication protocol.

13. A monitoring system for monitoring a status of a container, comprising:

a level sensing device for determining a level of a liquid in the container, the level sensing device comprising an actuator configured to exhibit different values of an operating parameter depending on whether the actuator is wet or dry; and a processor coupled to the actuator and configured to acquire, from the actuator, a present value of the operating parameter; and a host system in communication with the level sensing device, the host system comprising processing circuitry configured to:

receive, from the level sensing device, the present value of the operating parameter;

compare the present value of the operating parameter with a reference value of the operating parameter indicative of whether the level sensing device is fully above the liquid ('dry') or fully immersed in the liquid ('wet'); and provide, based on the comparison and on a determination, performed independently of the level sensing device, whether the level sensing device was wet or dry when the present value of the operating parameter was acquired by the processor of the level sensing device, an output indicative of the condition of the device.

14. The monitoring system according to claim 13, wherein:

the reference value of the operating parameter is stored in memory comprised in the level sensing device; and the processing circuitry of the monitoring system is further configured to acquire the reference value of the operating parameter from the level sensing device.

15. The monitoring system according to claim 13, wherein:

the monitoring system further comprises a level detection apparatus arranged and configured to determine the level of liquid in the tank; and the processing circuitry of the monitoring system is further configured to:

acquire, from the level detection apparatus, a signal indicative of a present level of liquid in the tank; and determine, based on the acquired signal from the level detection apparatus and a known level of the level sensing device, whether the level sensing device was wet or dry when the present value of the operating parameter was acquired by the processor of the level sensing device.

* * * * *